April 22, 1952   A. R. CURIONI   2,593,542
METHOD AND APPARATUS FOR SEVERING
AND SEGREGRATING MACARONI
Filed Aug. 18, 1945   4 Sheets-Sheet 1
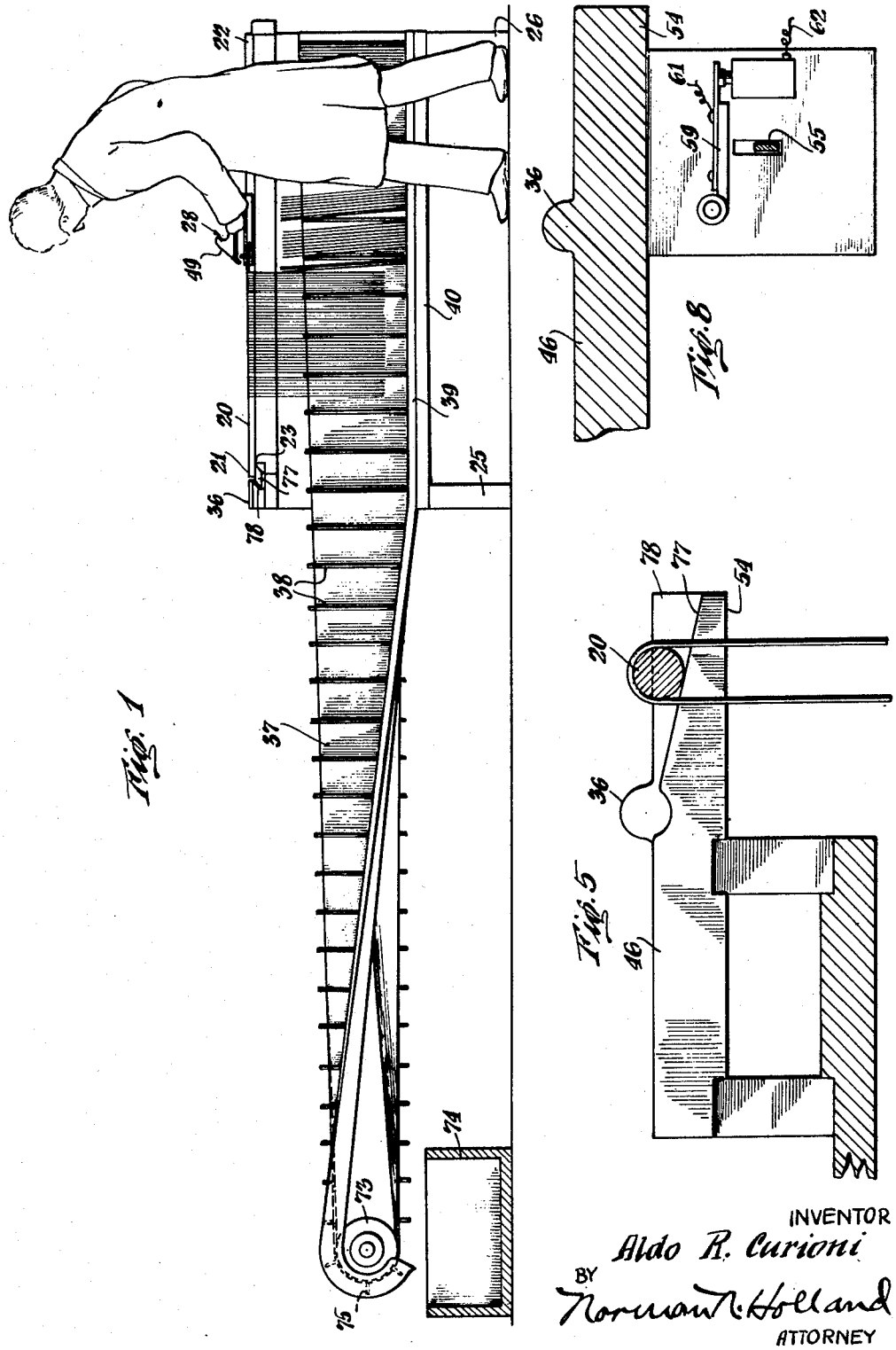
INVENTOR
Aldo R. Curioni
BY
Norman R. Holland
ATTORNEY

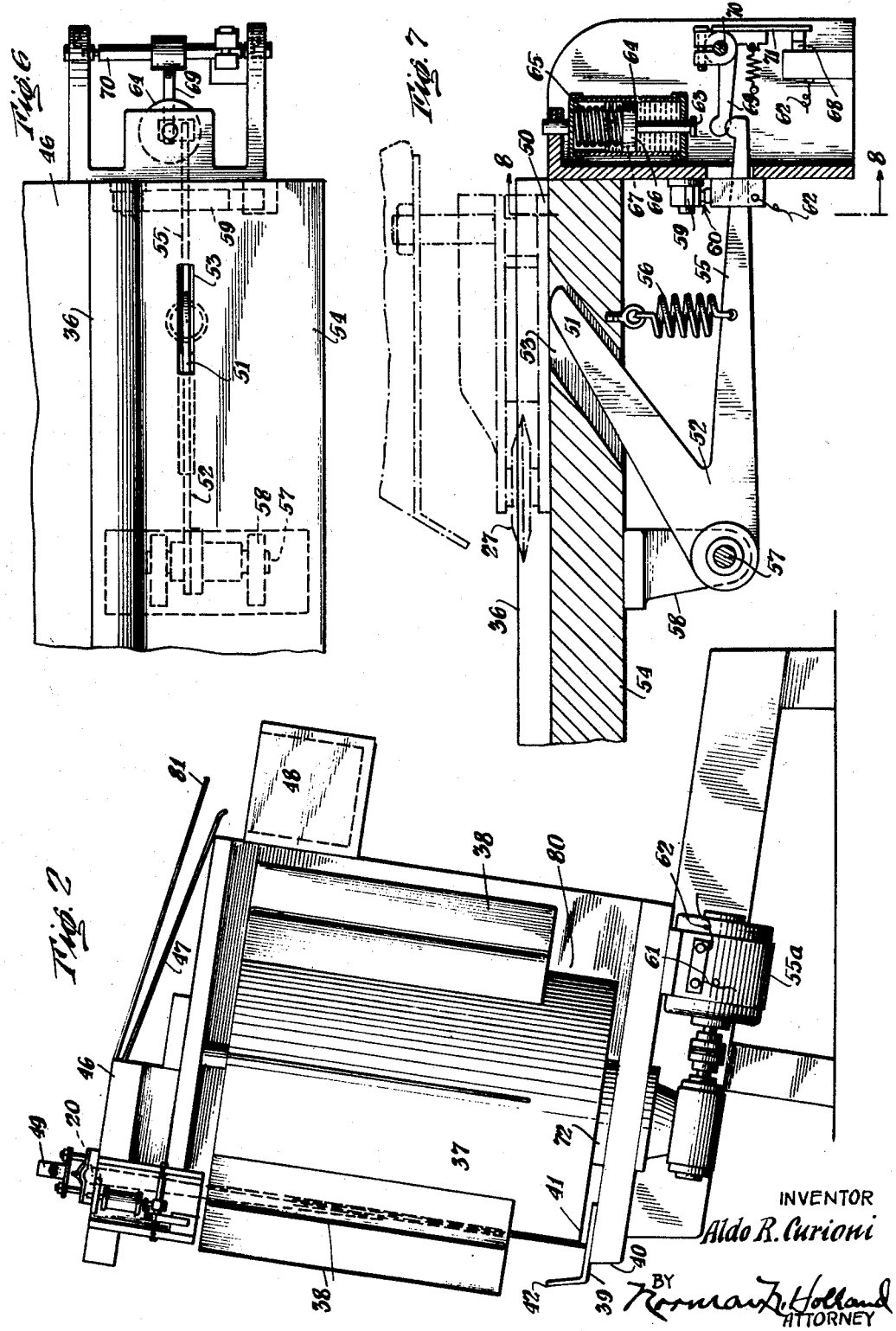

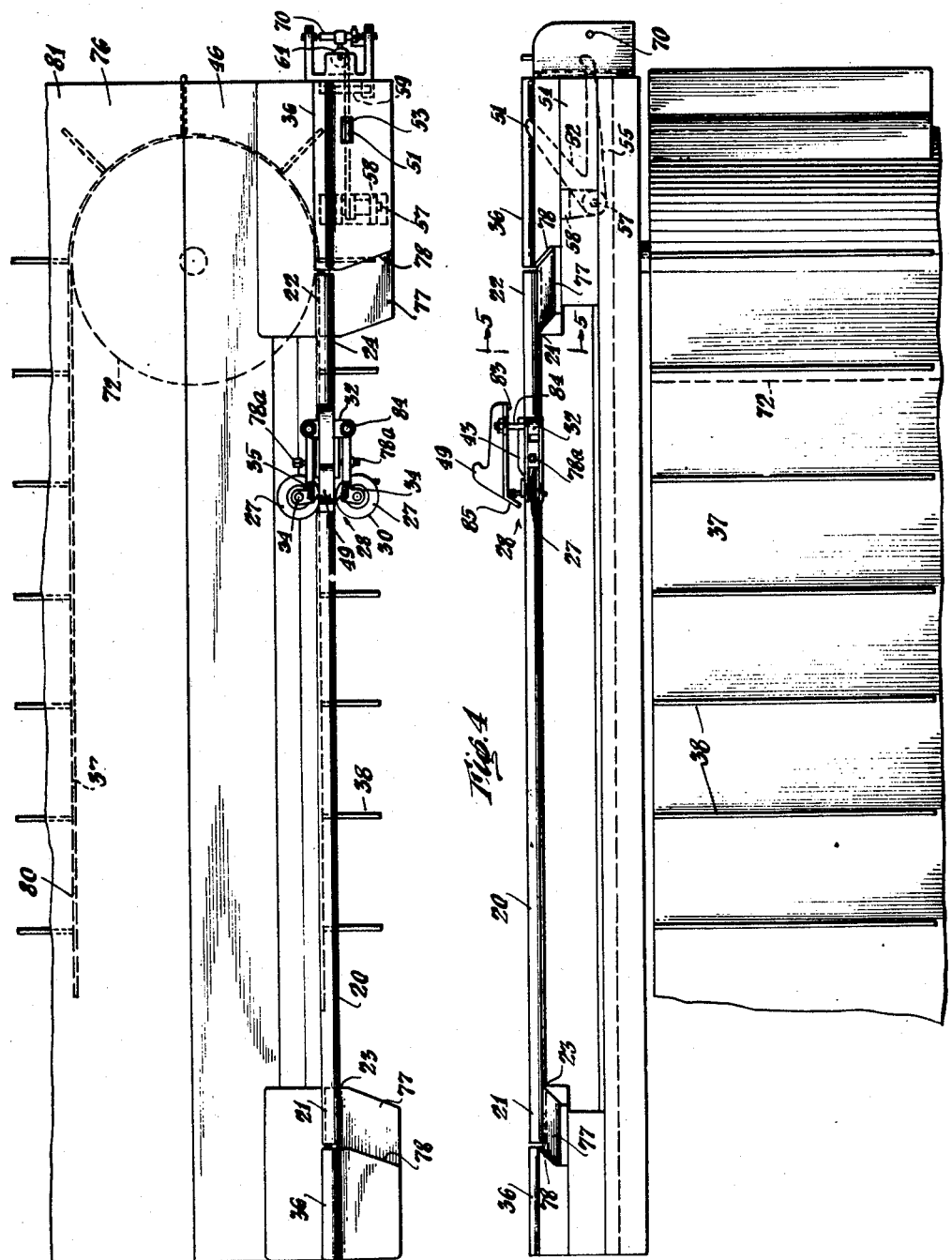

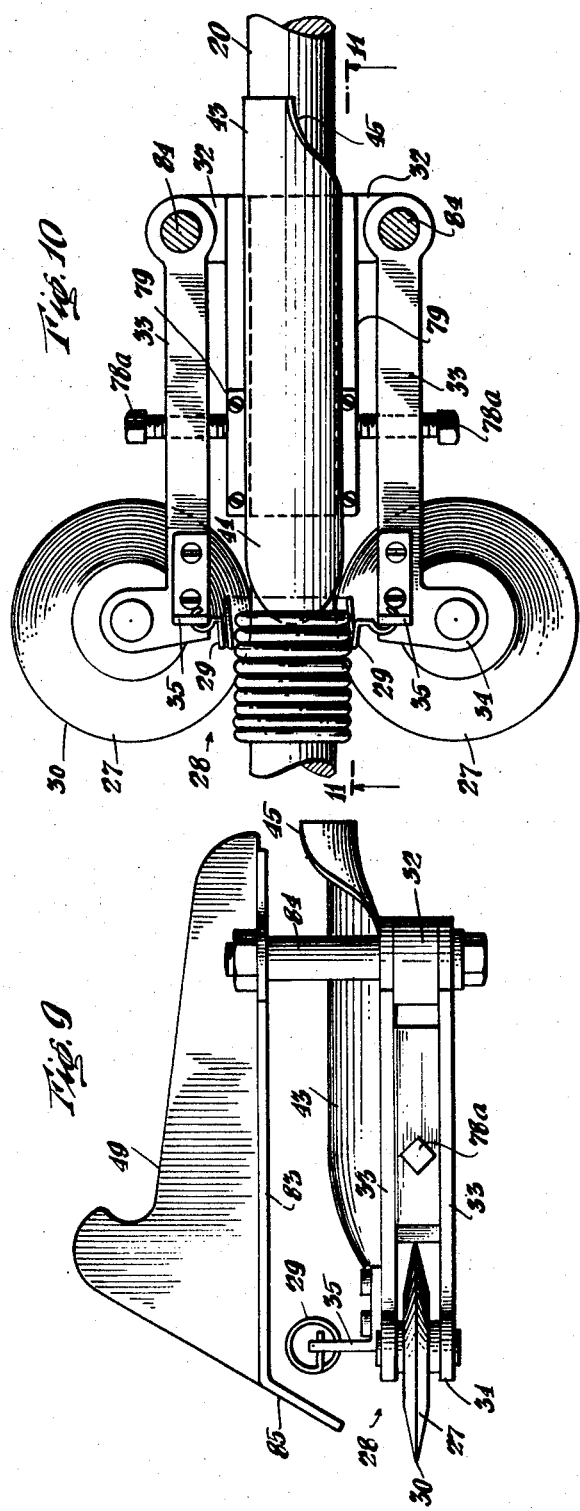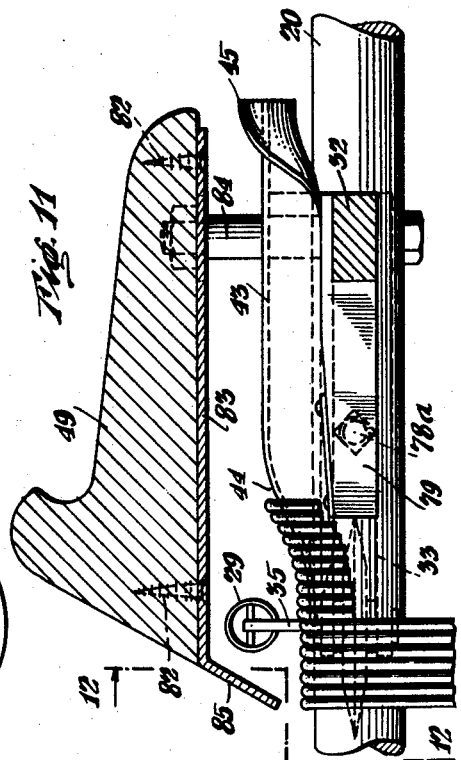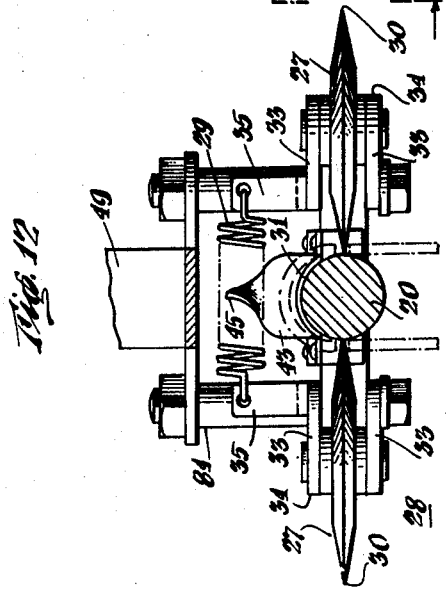

Patented Apr. 22, 1952

2,593,542

UNITED STATES PATENT OFFICE 2,593,542

METHOD AND APPARATUS FOR SEVERING AND SEGREGATING MACARONI

Aldo R. Curioni, New York, N. Y., assignor to Sarioni Company, Inc., New York, N. Y., a corporation of New York Application August 18, 1945, Serial No. 611,371

28 Claims. (Cl. 107—54)

This invention relates to devices for severing and segregating macaroni sticks and is herein disclosed in some detail as embodied in a device adapted to be used in the method of macaroni production which includes drying the sticks of macaroni by hanging them over rods.

When macaroni is thus dried while hanging suspended over rods, it hardens with a U at the point where it lay on the rod, and those U's for many years were a handicap in packing the macaroni in packages. It has become a common practice to break off the U's so that the straight sticks may be packed closely, and the U's may be packed by tumbling them into boxes where they interlace and pack themselves fairly closely. But the breaking off of the U's and separating them has been a relatively expensive item in packing the macaroni.

It has proved difficult to design mechanism for handling the awkward U-ended sticks of the macaroni, with the result that the operation has remained a hand operation. According to the present invention, the foregoing and other difficulties and objections are overcome, and a device is provided which eliminates almost all of the hand and arm operations in cutting out and segregating the U's and the straight sticks of macaroni, much waste and breakage of the macaroni is also eliminated, and the straight sticks may be delivered conveniently for packing.

In the form shown in some detail, knives are adapted to slide upon the rod from which the macaroni sticks dangle by their U's, and in one form the knife is adapted to cut both arms of the U free, guide the cut-off sticks to one side of a conveyor leading to a receptacle, and guide the cut-off U's to a receptacle, so that both the straight sticks and the U's are ready for packing.

The straight sticks of the macaroni may fall into partitioned off cells, which as here shown include a movable belt as one wall. Thus moving the belt carries the segregated straight sticks of macaroni to storage or packing. The knife shown includes as part of its structure a deflector or chute adapted to direct the cut-off U's to another chute or receptacle, thus facilitating the packing of the U's at will.

The completion of the cutting of all the macaroni on a bar may be caused to bring about the moving of the stick-receiving belt to carry off the cut sticks, thus making it possible to keep the belt normally at rest to receive the macaroni, and move it only when one emptied rod is being replaced by another or full rod.

An object of the invention is to reduce the manual handling of macaroni.

Another object of the invention is to reduce the breakage of macaroni.

Another object of the invention is to reduce the cost of handling macaroni preparatory to packing.

Another object of the invention is to cut the macaroni so that it drops vertically to a conveyor.

Another object of the invention is to deliver the macaroni laid horizontally convenient to handle.

A further object of the invention is to automatically move the macaroni out of the way while the operator is busy about other things.

Other and further objects of the invention will be obvious from an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a side view of one form of mechanism in use;

Fig. 2 is an end view of the same;

Fig. 3 is top view of the same;

Fig. 4 is an enlarged side view of the right hand end of Fig. 1;

Fig. 5 is a section on the line 5—5 of of Fig. 4, with the supporting rod partly slid into place;

Fig. 6 is an enlarged top view of the right hand end of Fig. 4;

Fig. 7 is a side view of the same parts;

Fig. 8 is a view on the line 8—8 of Fig. 7;

Fig. 9 is a side view of a knife;

Fig. 10 is plan view of a knife;

Fig. 11 is a view on the line 11—11 of Fig. 10; and

Fig. 12 is a view on the line 12—12 of Fig. 11.

In the form shown, macaroni which has dried or partly dried by being hung over a rod 20 has been brought to the device still hung on its rod 20 and the rod lowered until the ends 21, 22 have been rested in open-topped sockets 23, 24, which are formed at the tops of end supports 25, 26. The macaroni hanging on the rod 20 is adapted to be cut by the sharp edged rotating wheels 27 forming part of a knife 28 and drawn together by a spring 29 so as to run their cutting edges 30 on the sides of the rod 20 at its equator.

The knife 28 is guided for this purpose by an inverted trough 31 which fits on the upper half of the rod 20 and carries ears 32 to which are pivoted forwardly-extending arms 33 which carry ears 34 in which the knives 27 are journalled, preferably in ball bearings. The spring 29 is shown as an anchored in upstanding ears 35 on the pivoted arms 33 to draw the knives 28 together.

When a rod 20 carrying macaroni is placed on the sockets 23, 24, the knife body, including the inverted trough 31, is slid along the dummy extension 36 of the rod 20, and then on the rod 20 to carry the knives 28 along the rod 20 at the ends of its horizontal diameter so as to cut the macaroni hanging on it with the result that the depending severed straight lengths of macaroni drop or slide down into nearly vertical cells divided off on a belt 37 by transverse projecting ribs 38 which may be metal. The belt 37 is shown as a continuous broad surface having its macaroni-receiving surface to one side of the rod 20 and slanting enough beyond the opposite side to receive the macaroni severed by each of the knife wheels 27 without much of a drop or jar.

The macaroni which drops onto the belt 37 is held against slipping off the belt because its lower end strikes and rides on a projecting horizontal plate 39 (Fig. 2) carried on the lower structure 40 just below the lower edge 41 of the belt 37. The plate 39 is shown with a turned up outer edge 42 to prevent the ends of the macaroni sticks from slipping out and off the belt 37.

At the same time that the knife is dropping cut straight sticks of macaroni on the belt 37, the knife trough 31 is stripping the U's (see Fig. 11) by a thin forwardly-projecting plough 43, so that the U's are pushed up on the upper surface of the trough 31 by being pushed against the still-uncut macaroni on the rod 20, until finally the U's ride up on a deflector surface 44. Then a turned up edge 45 of the deflector 44 lifts the near side (Fig. 11) of the U's above the inverted trough 31 so they fall down the opposite side on a plank 46 near the rod 20, and eventually on a chute 47 down which they slide into a box or receiving trough 48. Preferably the trough 48 extends along the side 76 for a distance approximately equal to the length of a rod 20, so that it may receive elbow portions as the knife 28 moves along the rod 20 and cuts the material.

The knife 28 is shown with a spaced top handle 49 for convenience in manually pushing it. When the operator has pushed the knife 28 to the end of the rod 20, or as far as needed to cut all the macaroni on the rod, he pulls it back out of the way so that it rests upon the dummy extension rail 36. As the knife 28 is thus drawn back, its lower body member 50 depresses one arm 51 of a bell crank 52 to start the belt 37 to carry away the cut-off sticks of macaroni.

The arm 51 is shown in Fig. 4 as projecting up through a slot 53 in the plank 54 which forms part of the frame. When the arm 51 is thus depressed, it swings the other arm 55 against the tension of a spring 56 to turn on its pivot 57 in the bracket 58 so that the arm 55 drops to start the motor drive.

The starting of the motor 55a to drive the belt 37 is effected because the dropping of the arm 55 allowed a pivoted contact arm 59 to drop on the contact or button 60, closing the circuit 61, 62 to drive the motor. At the same time, the arm 55 dropped clear of the enlarged head 63 of the plunger 66 of dashpot 64, allowing the spring 65 of the dashpot to drive the plunger 66 down slowly because of the slow flow of fluid through the dashpot restricted opening 67.

The motor continues to run until a second contact 68 in the circuit 62 is opened when the descending head 63 strikes the horizontal arm 69 fast to a rock shaft 70 and swings the arm 69 to carry a second rock arm 71 away from the second contact 68, opening the circuit 62 and cutting off its power from the motor, thus stopping the belt 37.

Thus the dashpot 64, properly timed, runs the motor long enough to drive the belt 37 a sufficient time to carry all the cut macaroni beyond the end of a rod 20 while the knife 28 is not in use. The operator during this interval of time removes the empty rod 20 and replaces it with a second rod 20 carrying macaroni. Since the motor stops automatically, power will not be wasted nor the belt be driven in idle work.

When the operator picks up the knife 28, the arms 55 and 51 rise, breaking the motor circuit at the contact arm 59 and resetting the dashpot 64 for a second operation.

In the form shown, the belt 37 runs around a nearly vertical driving pulley 72 driven by the motor 55a and lies flat against a backing board (not shown) for the length of the rod 20, and then begins to turn its lower edge 41 up, because the belt 37 passes over the top of a horizontal pulley 73.

In passing over the horizontal pulley 73, the belt 37 dumps its load, as into a receiving bin 74. To enable the load of sticks of macaroni to be thus carried and dumped, the plate 39 is shown as extending straight along close to the straight run of the belt 37, then opposite the end of the rod 20 where the belt backing ends, rising up with the rising edge 41. Finally the outer edge 42 is extended over the whole width of the belt 37 where it runs on to the horizontal pulley 73, and extends down, following the curve of the belt 37 over the pulley at 75 so that it keeps the macaroni within the ribs 38 until the belt reaches the bottom of the pulley 73, and there ends, so that the macaroni is dumped squarely and flat into the bin 74.

Then the belt 37 continues its travel back, along the opposite side 76 of the device, to the nearly vertical pulley 72, which pulley is preferably large enough to keep returning side of the belt 37 spaced at the opposite side 76 of the device away from the macaroni-moving side of the belt.

The rod 20 is easily set in its correct position because the frame of the machine is provided with centering devices, including a long inclined plane 77, leading to each of the sockets 23, 24, so that the ends of the rod 20 may be laid on the inclined planes 77 and then pushed up along the inclines, and the rod 20 is automatically centered length wise by walls 78 at each socket 23, 24 that are directed inwardly so as to push the rod 20 lengthwise if out of center when sliding up on the planes 77.

To protect the cutting wheels 27 from injury, the pivoted arms 33 on which the wheels 27 are journalled are shown as carrying stops 78a adapted to impinge on the sides of the body 79 of the knife, and threaded in the arms 33 so as to be adjustable by turning them by their squared heads.

To protect the idle stretch 80 of the belt 37 there may be provided a cover 81 extending over it and above the chute 47. To protect the hand of the operator on the knife, the handle 49 may be a wooden projection held by screws 82 to a broad plate 83 well above the plough 43 and deflector 45, and supported on rear posts 84, with a hood 85 at the front of the plate 83. The posts 84 may take the form of continuations of the pivots in the ears 32.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described one embodiment of the invention in some detail, what is claimed is:

1. In a machine of the class described, the combination with means for supporting a rod holding U-shaped lengths of macaroni, of a knife for cutting dangling sticks from connecting U's of said lengths, a movable member at a lower elevation than the rod adapted to receive sticks cut from said lengths, additional means movable with said first mentioned movable means for holding the sticks nearly upright, means adapted to receive the sticks from the movable means, and means for separately receiving U's separated from the sticks.

2. In a machine of the class described, the combination of devices for supporting a rod holding U-shaped lengths of macaroni, a dummy extension of said rod so that knife means travelling along the rod travels smoothly at the extreme end of the rod, knife means movable along said rod for cutting stick portions from U-portions of said macaroni lengths, a belt below said rod having side edge portions at different elevation adapted to carry off the straight sticks cut by the knife, and a separate chute to separately receive U's cut from the lengths.

3. In a machine of the class described, the combination with devices for supporting a rod holding U-shaped lengths of macaroni, of a normally idle belt having side edges at different elevations adapted to receive straight stick portions of macaroni cut off by a knife travelling along the rod, means including a movable member adapted to be actuated by the knife at one end of its travel to start travel of the belt, and means for later interrupting said belt travel.

4. In a machine of the class described, the combination with devices for supporting a rod holding U-shaped lengths of macaroni, of a transversely inclined normally idle belt adapted to receive straight stick portions of macaroni cut off by a knife travelling along the rod, a dummy extension in alignment with the rod on which the knife travels to cut evenly at the end of the rod, a movable member actuated by travel of the knife on the dummy extension adapted to initiate travel of the belt, and means for later interrupting said belt travel.

5. In a machine of the class described, the combination of devices for supporting a rod holding U-shaped lengths of macaroni, a knife for severing the U's from the straight arms of said lengths, a normally idle belt below said rod on which the straight arms of the lengths fall, means movable with the belt for holding the straight arms nearly vertical on the belt, a discharge member for receiving the straight arms from the belt, and means controlled by the knife at one end of its travel for starting the belt to cause it to deliver its load of macaroni at the discharge member.

6. In a machine of the class described, the combination with devices for supporting a rod holding U-shaped lengths of macaroni, of a knife for severing the U's from straight arms of said lengths, a normally idle belt lower than said rod having a transversely inclined surface on which the straight arms of the lengths fall, means carried by the belt for cooperating therewith in holding the straight arms nearly vertical on the belt, a discharge member for receiving the straight arms from the belt, means controlled by the knife at one end of its travel for starting the belt to cause it to deliver its load of macaroni at the discharge device, and means for automatically stopping the belt when the load is so delivered.

7. In a machine of the class described, the combination of devices for supporting a rod holding U-shaped lengths of macaroni, knives travelling along opposite sides of the rod to sever curved U's from stick portions of the macaroni, a belt below said rod onto which the sticks fall, an end delivery device by which the belt delivers the sticks, and a separate means adjacent said rod for receiving and guiding said curved U's.

8. In a machine of the class described, the combination of devices for supporting a rod holding U-shaped lengths of macaroni, knives travelling along opposite sides of the rod to sever curved U's from stick portions of the macaroni, a belt at a lower elevation than said rod onto which the sticks fall, an end delivery device by which the belt delivers the sticks, a separate means adjacent said rod for receiving said curved U's, a normally idle drive for the belt, and a device actuated by the knife for causing the drive to become effective.

9. In a machine of the class described, the combination of devices for supporting a rod holding U-shaped lengths of macaroni, knives travelling along opposite sides of the rod to sever connecting U's from stick portions of the macaroni, a belt at a lower elevation than said rod onto which the sticks fall, an end delivery device partially enclosing one end of said belt and through which the belt delivers the sticks, a separate receiving means for the U's, a normally idle drive for the belt, a device actuated by the knife for causing the drive to become effective, and means for automatically stopping the belt when it has travelled the length of the rod.

10. In a machine of the class described, the combination with a device for supporting a rod holding U-shaped sticks of macaroni, of a knife having a handle and a bottom member and including cutting wheels to travel on the rod to cut the macaroni, a belt on which the cut sticks fall, a trip operated by the bottom member, and a normally idle drive for the belt adapted to be started by said trip.

11. In a machine of the class described, the combination with a device for supporting a rod holding U-shaped sticks of macaroni, of a knife having a hande and a bottom member and including cutting wheels to travel on the rod to cut the macaroni, a belt on which the cut sticks fall, a dummy extension for the rod on which the knife travels, a trip at the extension operated by the bottom member, and a normally idle drive for the belt adapted to be started by said trip.

12. In a machine of the class described, the combination with a device for supporting a rod holding U-shaped sticks of macaroni, of a knife having a handle and a bottom member and including spaced cutting wheels at opposite sides of the rod to travel on the rod at opposite sides thereof to cut the macaroni, a plough on the knife to separate cut U's, a belt on which the cut sticks fall, a trip operated by the bottom member, and a normally idle drive for the belt adapted to be started by said trip.

13. In a machine of the class described, the combination of means for supporting a rod carrying dangling lengths of substantially U-shaped macaroni, means for cutting the macaroni on the rod to detach curved supporting portions from side sticks thereof, means including a nearly vertical wall adapted to receive the cut-off sticks nearly vertically, and additional means for turning the nearly vertical wall to a nearly horizontal position to deliver the sticks horizontally.

14. In a machine of the class described, the combination of means for supporting a rod carrying dangling lengths of macaroni, having substantially U-shaped end portions and depending stick-like portions, means for cutting the macaroni on the rod to detach the U-shaped end portions, means including a nearly vertical wall adapted to receive the cut-off sticks nearly vertically, additional means for turning the nearly vertical wall to a nearly horizontal position to deliver the sticks horizontally, and separate guide means adjacent said cutting means to carry off the separated U-shaped end portions.

15. In a machine of the class described, the combination with devices for supporting a rod carrying dangling lengths of substantially U-shaped macaroni, of means for cutting the macaroni on the rod to detach the U's from stick portions thereof, a belt having a nearly vertically disposed wall portion adapted to support the cut-off sticks nearly vertically, means for turning said wall portion of the belt as it travels to deliver the sticks horizontally, and an inclined plane at each device on which the end of the rod may rest and be guided up to the supporting device.

16. In a machine of the class described, the combination with devices for supporting a rod carrying dangling lengths of macaroni having U-shaped end portions and depending stick portions, of means for cutting the macaroni on the rod to detach the U-shaped end portions, a belt having a nearly upright wall adapted to receive the cut-off sticks nearly vertically and so support them, means for turning the belt wall as it travels to deliver the sticks horizontally, an inclined plane at each device on which the end of the rod may rest and be guided up to the supporting device, and guiding end walls for centering the rod longitudinally.

17. A knife of the class described comprising a trough to run on a rod, a pair of arms pivoted on the trough, rotating knives to run on the rod and journalled separately on the arms, and a spring urging the knives against the rod.

18. A knife of the class described comprising a trough to run on a rod, a pair of arms pivoted on the trough, rotating knives to run on the rod and journalled separately on the arms, a spring urging the knives against the rod, and adjustable stops on the arms adapted to strike the trough to limit the throw of the arms.

19. A knife of the class described comprising a trough to run on a rod, a pair of arms pivoted on the trough, rotating knives to run on the rod and journalled at least one on each of the arms, a spring urging the knives against the rod, and a plough carried by the trough.

20. In an apparatus of the class described, the combination of, means adapted to hold a rod-like member having lengths of material suspended in substantially U-shape along the length thereof, means pressing against the rod at opposite sides thereof and adapted to cut the material at opposite sides of the rod to thereby detach short arcuate supporting portions from the elongated straight portions of the suspended material, and means for receiving and supporting in upright position the elongated substantially straight portions separated from said arcuate portions.

21. In an apparatus of the class described, the combination of, means adapted to support a rod having lengths of material such as macaroni, hung thereon, means adjacent said rod adapted to sever curved supporting portions of said material from substantially straight portions thereof, and means for moving said curved portions upwardly away from the straight portions and the vicinity of said severing means.

22. In an apparatus of the class described, the combination of, means adapted to support a rod having lengths of material such as macaroni hung thereon, a plurality of spaced cutters adapted to sever curved supporting portions of said material from substantially straight portions thereof, means yieldably urging said spaced cutters toward said rod, and means for elevating said curved portions away from the vicinity of said rod and said severing means.

23. In an apparatus of the class described, the combination of, means adapted to support a rod having lengths of material such as macaroni hung thereon, a plurality of spaced and rotatable cutters in horizontal alignment with said rod and at opposite sides thereof adapted to sever supporting portions of said material at oppositely disposed sides of said rod to thereby separate curved portions from substantially straight portions thereof, yieldable means urging said cutters toward each other, means for selectively determining the extent of movement of said cutters toward each other, and means for removing said curved portions from the vicinity of said severing means.

24. The method of treating materials of the class described which comprises supporting the material to be treated on a rod-like member so that leg portions hang downwardly at opposite sides of the rod-like member and are supported by a connecting portion, separating said connecting portion from said leg portions, and moving said separated connecting portion away from the rod-like member.

25. The method of treating materials of the class described which comprises suspending the material to be treated so that leg portions hang downwardly and are supported by a common connecting portion, separating said connecting portion from said leg portions, thereafter elevating said separated connecting portion with respect to separated leg portions and conveying it away from the location where separating occurs.

26. The method of treating materials of the class described which comprises supporting the material to be treated on a rod-like member so that leg portions hang downwardly at opposite sides of the rod-like member and are supported by a connecting portion, cutting said material at opposite sides of said rod-like member to separate said connecting portion from said leg portions, and moving said separated connecting portion away from the rod-like member.

27. The method of treating materials of the class described which comprises suspending the material to be treated so that leg portions hang downwardly and are supported by a common connecting portion, separating said connecting portion from said leg portions, temporarily supporting said leg portions in an on-end relationship and thereafter turning them to a generally horizontal position for facilitating packaging thereof, and lifting said separated connecting portion away from said leg portions.

28. In a machine of the class described, the combination of means for supporting a rod holding U-shaped lengths of macaroni, knife means adjacent said rod for cutting stick portions from connecting U's of said lengths, stick portion receiving means at a lower elevation than said rod having a wall portion adjacent the knife means with an edge higher than an opposite edge and having additional wall portions spaced from each other and angularly disposed with respect to the first wall portion, said wall portions being adapted to hold a stick portions nearly upright, means for turning said first wall portion and additional wall portions toward a horizontal plane to thereby turn the stick portions from nearly upright to generally horizontal position, means adapted to catch stick portions released horizontally from said receiving means, and means for removing U-s cut from said lengths.

ALDO R. CURIONI.

REFERENCES CITED

The following references are of record in the file of this patent:

UNITED STATES PATENTS

| Number | Name | Date |
|---|---|---|
| 5,3,369 | Price | Mar. 17, 1896 |
| 1,029,059 | Gammel | June 11, 1912 |
| 1,202,435 | Scardino | Oct. 24, 1916 |
| 1,257,966 | Barducci | Mar. 5, 1918 |
| 1,286,028 | Kraybill | Nov. 26, 1918 |
| 1,406,497 | Rutledge | Feb. 14, 1922 |
| 1,487,324 | Fontana | Mar. 18, 1924 |
| 1,720,305 | Tjernlund | July 9, 1929 |
| 2,316,205 | Williams | Apr. 13, 1943 |